No. 847,069. PATENTED MAR. 12, 1907.
T. L. HAWKINS.
CAR WHEEL.
APPLICATION FILED APR. 11, 1906.
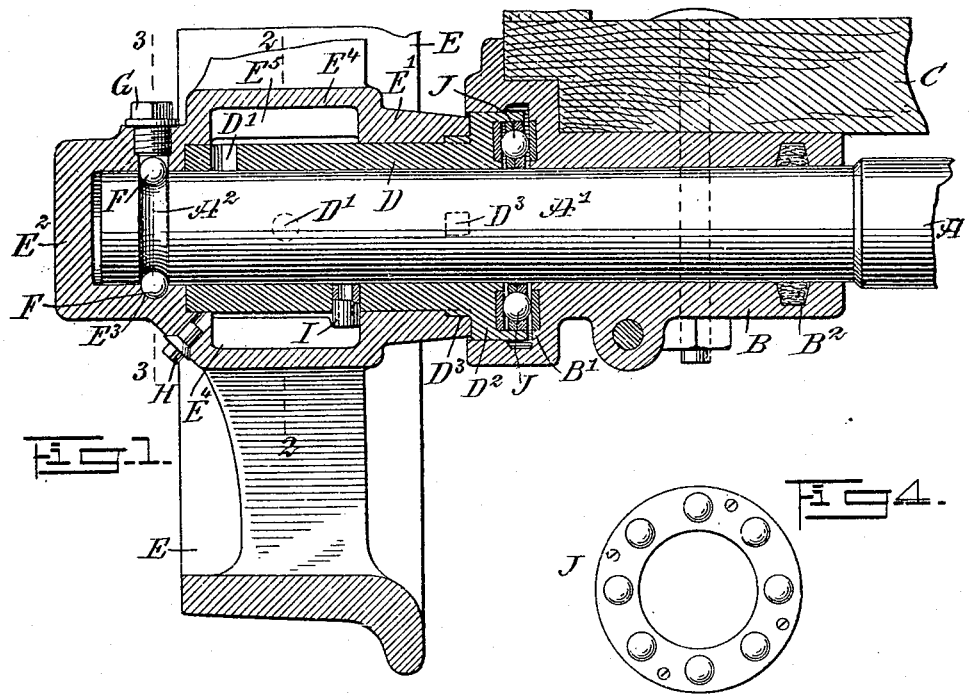
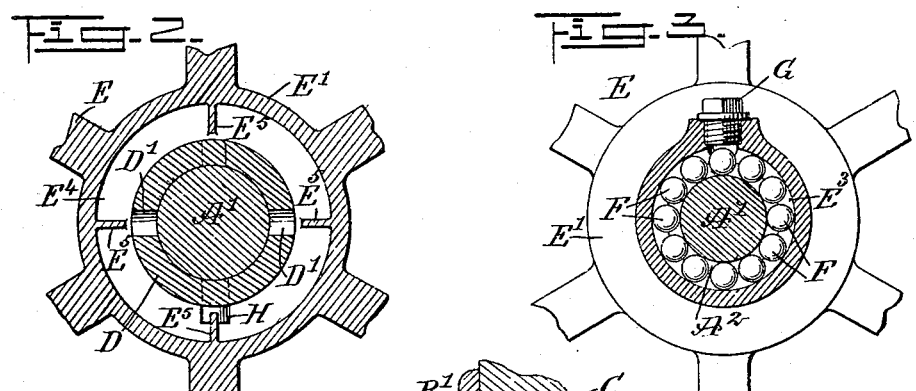
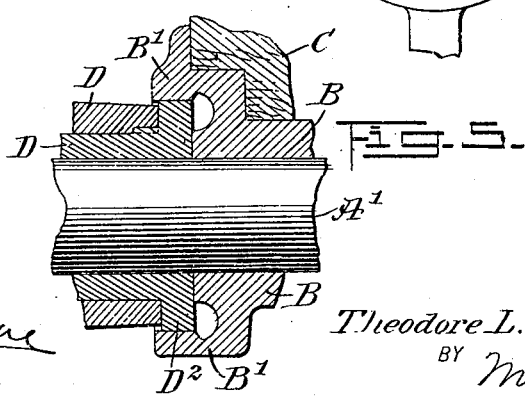
WITNESSES
INVENTOR
Theodore L. Hawkins
BY
ATTORNEYS

UNITED STATES PATENT OFFICE.

THEODORE L. HAWKINS, OF PITTSBURG, PENNSYLVANIA.

CAR-WHEEL.

No. 847,069.      Specification of Letters Patent.      Patented March 12, 1907.

Application filed April 11, 1906. Serial No. 311,066.

*To all whom it may concern:*

Be it known that I, THEODORE L. HAWKINS, a citizen of the United States, and a resident of Pittsburg, in the county of Allegheny and State of Pennsylvania, have invented a new and Improved Car-Wheel, of which the following is a full, clear, and exact description.

The invention relates to railroad and mining cars having the wheel mounted to rotate loosely on the axles.

The invention consists of novel features and parts and combinations of the same, which will be more fully described hereinafter and then pointed out in the claims.

A practical embodiment of the invention is represented in the accompanying drawings, forming a part of this specification, in which similar characters of reference indicate corresponding parts in all the views.

Figure 1 is a transverse section of the improvement as applied. Fig. 2 is a sectional side elevation of the same on the line 2 2 of Fig. 1. Fig. 3 is a similar view of the same on the line 3 3 of Fig. 1. Fig. 4 is a face view of the end-thrust ball-bearing, and Fig. 5 is a cross-section of a modified form of the improvement.

The journal $A'$ of the car-axle $A$ extends through the pedestal $B$, secured in the usual manner to the body $C$ of a car, and the said journal $A'$ also extends through a bushing $D$, secured in the hub $E'$ of a car-wheel $E$. The outer end $E^2$ of the hub $E'$ is closed, and the forward end of the journal $A'$ projects beyond the outer end of the bushing $D$ and into the closed end $E^2$ of the hub $E'$, as plainly indicated in Fig. 1. In this outer end $E^2$ of the hub is formed an interior annular recess $E^3$, in register with an annular recess $A^2$, formed on the peripheral surface of the journal $A'$, and the said registering recesses $E^3$ $A^2$ are filled with balls $F$, so as to hold the hub $E'$ against longitudinal movement on the journal $A'$ of the axle. A screw-plug $G$ screws in the hub $E'$ at the recess $E^3$ to permit of placing the balls $F$ in position in the said recesses when assembling the several parts.

Within the hub $E'$ is formed an annular recess $E^4$, surrounding a portion of the bushing $D$, so as to form with the latter an oil-well for containing oil or other suitable lubricant. In the bushing $D$ are formed a number of apertures $D'$ for conducting the lubricant from the oil-well to the peripheral surface of the journal $A'$ to keep the bearing parts well lubricated. As shown in Figs. 1 and 2, the hub $E'$ is provided inside of the recess $E^4$ with radial partitions $E^5$, extending with their inner ends within a short distance of the peripheral surface of the bushing $D$, and these partitions $E^5$ serve to retain solid grease or other lubricant within the oil-well when assembling the parts, the grease melting as soon as the working parts become heated when the car is in use.

A filling screw-plug $H$ screws in the hub $E'$ to allow of filling the oil-well periodically with the necessary oil. One of the openings $D'$ in the bushing $D$ is provided with an aperture-retaining plug $I$, extending into the recess $E^4$ and resting on one of the partitions $E^5$ adjacent to the inner end wall of the recess $E^4$, so as to prevent longitudinal movement of the bushing $D$ in the hub $E'$. The inner end of the bushing $D$ is provided with a head $D^2$, fitting into a recess $B'$, formed on the outer end of the pedestal $B$, so as to render the device comparatively dustproof, and, if desired, an end-thrust ball-bearing $J$ may be placed between the face of the head $D^2$ and the wall of the recess $B'$ to take up all end thrusts. As shown in Fig. 5, this end-thrust bearing $J$ is omitted, and in this case the head $D^2$ fits snugly in the recess $B'$ of the pedestal $B$. The outer surface of the bushing $D$ adjacent to the head $D^2$ is preferably provided with ribs $D^3$, fitting corresponding recesses in the inner end of the hub $E'$ to assist in holding the bushing $D$ from turning in the hub $E'$. An interior annular recess $B^2$ is formed adjacent to the inner end of the pedestal $B$, and this recess is filled with cotton or other suitable material to retain the oil on the journal $A'$, and consequently within the pedestal $B$ and the bushing $D$.

By the arrangement shown and described the several parts can be readily assembled, and by the use of the balls $F$, engaging the recesses in both the journal $A'$ and the hub $E'$, the car-wheel $A$ is held against longitudinal movement on the journal and without undue friction or binding of the parts. In case the journal $A'$ and the bushing $D$ become worn to a considerable extent then it is only necessary to replace the worn-out bushing D by a new one, so that both the axle as well as the car-wheel A can be used.

Having thus described my invention, I claim as new and desire to secure by Letters Patent—

1. The combination of a pedestal with a car-wheel, a bushing for the wheel, and an axle-journal extending through the said pedestal into the said bushing, said pedestal having a recess for receiving the bushing.

2. The combination of a pedestal having a bearing for an axle-journal and provided with an annular recess, a car-wheel, a bushing for the wheel extending into the recess of the pedestal, and an axle having its journal extending through the said pedestal-bearing and the said bushing.

3. The combination of a pedestal having a bearing and an annular recess at its outer end, a car-wheel, a bushing in the hub thereof, the inner end of which bushing is provided with a head fitting the said pedestal-recess.

In testimony whereof I have signed my name to this specification in the presence of two subscribing witnesses.

THEODORE L. HAWKINS.

Witnesses:
   THOMAS W. COHILL,
   THOMAS G. HUILSTON.